Oct. 19, 1965   J. W. McMILLEN, JR., ETAL   3,213,221
DISCONNECTING STRUCTURE FOR ENCLOSED ELECTRICAL APPARATUS
Filed April 10, 1963                                       2 Sheets-Sheet 2

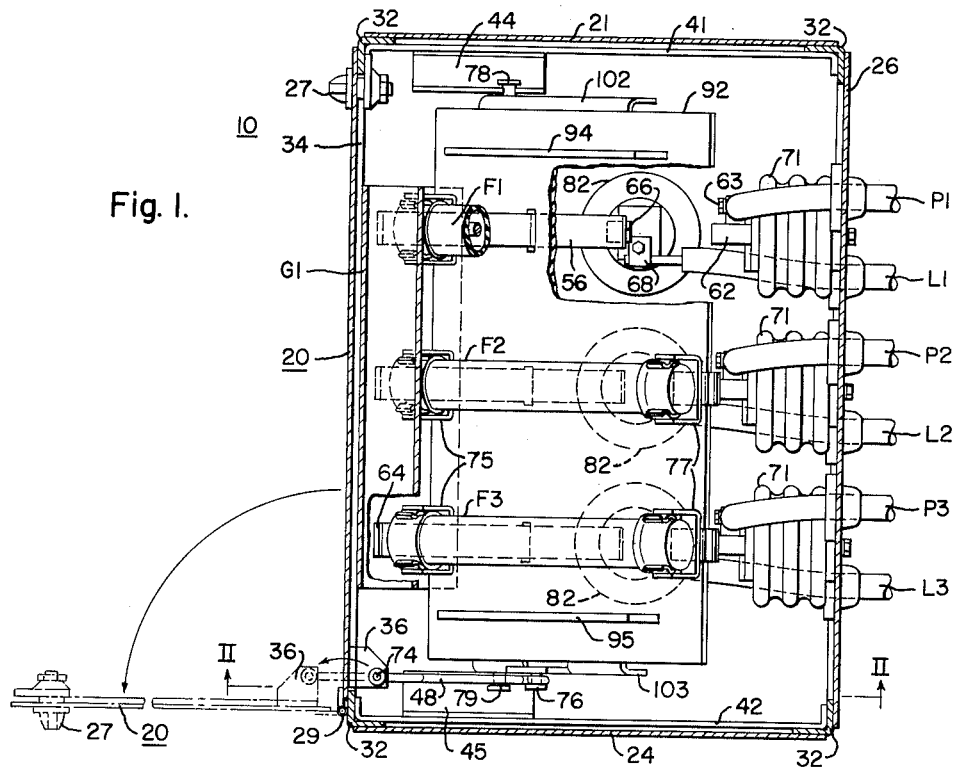

United States Patent Office 3,213,221
Patented Oct. 19, 1965

3,213,221
DISCONNECTING STRUCTURE FOR ENCLOSED ELECTRICAL APPARATUS
James W. McMillen, Jr., Monroeville, and Sidney R. Bithell, Sr., Penn Hills, Pittsburgh, Pa., assignors to Westinghouse Electric Corporation, East Pittsburgh, Pa., a corporation of Pennsylvania
Filed Apr. 10, 1963, Ser. No. 272,090
8 Claims. (Cl. 200—50)

This invention relates to switchgear apparatus and more particularly to switchgear apparatus of the metal-enclosed type.

In the construction of switchgear apparatus of the metal-enclosed type, it is sometimes necessary to provide a compartment in which are disposed electrical apparatus units, such as potential transformers or disconnecting fuses, which are normally connected to a high voltage electric power circuit. In order to protect operating personnel who may have occasion to open the door of such a compartment for inspection or maintenance purposes and to provide access to the electrical apparatus units disposed therein, means have been employed in the past to disconnect such electrical apparatus units from the associated power circuits and to actuate the apparatus units to positions where they may more easily be inspected when the door of the compartment is opened. Since the arrangements which have been employed in the past for this purpose have been somewhat complicated, it is desirable to provide an improved switchgear apparatus of the type described in which the structure is simplified and which also offers several other advantages.

It is an object of this invention to provide a new and improved switchgear structure of the enclosed type.

A more specific object of this invention is to provide a metal-enclosed switchgear structure adapted to house electrical apparatus units of different types, such as potential transformers or protective fuses.

A still further object of this invention is to provide an improved means for actuating a movable member which supports one or more electrical apparatus units or devices in a switchgear housing upon opening or closing of the door of the housing.

Other objects of the invention will, in part, be obvious and will, in part, appear hereinafter.

For a fuller understanding of the nature and objects of the invention, reference should be had to the following detailed description taken in connection with the accompanying drawings, in which:

FIGURE 1 is a view, partly in plan and partly in section, of a switchgear structure illustrating a first embodiment of the invention;

FIGURE 2 is a view, partly in side elevation and partly in section, of the structure shown in FIGURE 1;

Figure 3:
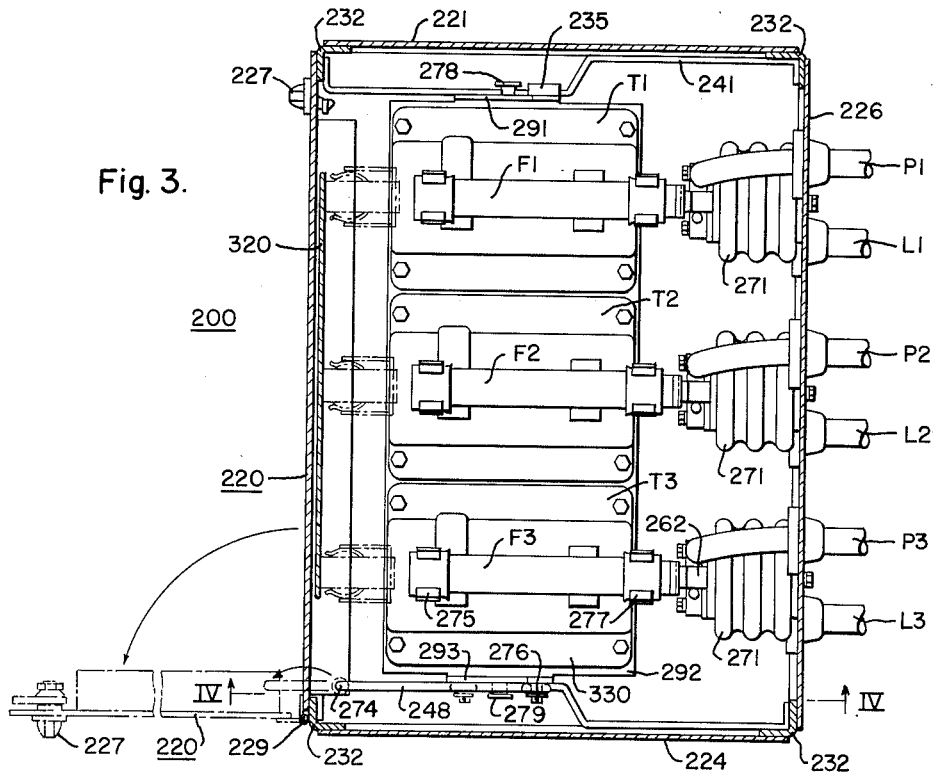
FIGURE 3 is a view, partly in plan and partly in section, of a switchgear apparatus illustrating a second embodiment of the invention.

Referring now to the drawings and FIGURES 1 and 2 in particular, the switchgear apparatus shown comprises a housing or cell 10 which may be of the type utilized in metal-enclosed switchgear. As illustrated, the housing or compartment 10 comprises the angle members 32 and 33, the top member 23, the bottom member 25, the rear wall member 26, and the side wall or plate members 21 and 24. A door 20 is provided at the front of the housing 10 and is rotatably supported at one side of the housing by a hinge 29 on one of the vertical angle members 32. The door 20 may also include a conventional handle and latching means, as indicated at 27, which engages one of the vertical angle members 32 at the opposite side of the housing 10 from the hinge 29 when the door 20 is in the closed position.

In order to provide a movable support for one or more electrical apparatus units or devices, such as the disconnecting fuse units F1, F2 and F3 shown in FIGURE 1, a carrier or cradle member 92 is disposed within the housing 10. When employed with disconnecting fuse units as shown in FIGURE 1, the carrier or base member 92 is preferably formed from an electrically insulating sheet or plate material in order to provide electrical creep insulation between the respective fuse units which are disposed in side by side relation. In order to adapt the carrier member 92 for rotation within the housing 10 about a horizontal axis which is substantially parallel to and spaced from the door 20 when the door 20 is in its closed position, the carrier member 92 is provided with the pivot means 78 and 79 at the opposite side thereof, said pivot means extending laterally in opposite directions from the carrier member 92. The pivot means 78 and 79 are mounted on the depending portions of the associated bracket members 102 and 103 respectively which, in turn, are fixedly secured to the carrier member 92 by any suitable means, such as bolts, for rotation with said carrier member.

In order to rotatably support the carrier member 92 within the housing 10, the horizontal bracket or rail members 44 and 45 are disposed inside the housing 10 adjacent to the side wall members 21 and 24, respectively, to receive the pivot means 78 and 79, respectively, of the carrier member 92. The bracket members 44 and 45 are secured or fastened to the associated horizontal bracing members 41 and 42, respectively, by any suitable means, such as welding or bolts, and the bracing members 41 and 42, in turn, are secured or fastened to the adjacent vertical angle members 32 at each side of the housing 10 by any suitable means such as those just mentioned. Each of the bracket members 44 and 45 includes a slot or recess 86 to receive one of the pivot means 78 or 79 of the carrier member 92, as best shown in FIGURE 2. It is to be noted that the carrier member 92 is releasably supported by the bracket members 44 and 45 and that under certain circumstances, it is possible to slidably remove the carrier member 92 from the housing 10 by lifting the pivot means 78 and 79 of the carrier member 92 out of the respective slots in the bracket members 44 and 45 and then moving the carrier member 92 out of the housing 10 in a horizontal direction with the pivot means 78 and 79 sliding on top of the associated bracket members 44 and 45, respectively.

In order to provide additional electrical creep insulation between the electrical apparatus units, such as the fuse units F1 to F3 disposed on the carrier member 92 and the grounded portions of the housing 10, the electrically insulating members 94 and 95 may be disposed adjacent to the opposite sides of the carrier member 92 and to extend in both directions away from the plane of carrier member 92 in a plane which is substantially perpendicular to the plane of the carrier member 92.

In order to releasably support the fuse units F1, F2 and F3 on the carrier member 92, three pairs of fuse clips or terminals 75 and 77 are mounted or disposed at the front and back, respectively, of the carrier member 92 for rotation therewith. Each of the fuse terminals 77 is electrically connected to a movable contact member 52 which is also mounted on the carrier member 92 and arranged for rotation therewith. When the carrier member 92 is in its normal operating position as shown in FIGURES 1 and 2, each of the movable contact members 52 is disposed to engage a stationary contact member 62 which is mounted on top of an electrical insulator 71, which, in turn, is mounted on the rear wall member 26 of the housing 10. Each of the stationary contact members 62 is electrically connected to one of the power conductors or lines P1, P2 or P3 through an associated terminal connector 63 to each form an electrically conducting path when the movable contact members 52 engage the associated stationary contact members 62 which extends from one end of each of the fuse units F1, F2 and F3 at one of the fuse terminals 77, through one of the movable contact members 52, through one of the stationary contact members 62, and one of the terminal connectors 63 to one of the power conductors P1, P2 or P3, respectively. Each of the fuse terminals 77 is also electrically connected to a movable contact member 54 which is also mounted on the carrier member 92 for rotation therewith to engage a grounding contact member or bar G1 when the carrier member 92 is rotated to a second operating position within the housing 10. The grounding contact bar is disposed inside the housing 10 in the line of movement of all three movable contact members 54 associated with the respective fuse units F1, F2 and F3. The movable contact members 52 and 54 are preferably formed from a resilient conducting material and it is to be noted that the movable contact members 52 and 54 associated with each of the fuse units F1 to F3 may be combined in a single movable contact member in certain applications by moving each of the stationary contact members 62 and their associated insulators 71 to a higher position on the rear wall member 26 of the housing 10 where electrical insulating clearances permit. In other words, a single movable contact member associated with each of the fuse units F1, F2 and F3 would function to electrically connect one end of the associated fuse unit to one of the associated power conductors and would also function as a grounding contact member to engage the grounding contact bar G1.

Similarly, each of the fuse terminals 75 is electrically connected to a movable contact member 56 which is also mounted on the carrier member 92 for rotation therewith to engage an associated stationary contact member 66 which is mounted on an electrical insulator 82, which, in turn, is supported on the bottom 25 of the housing 10. Each of the stationary contact members 66 is electrically connected through a terminal connector 68 to one of the load or power conductors L1, L2 or L3. One end of each of the fuse units F1, F2 and F3 is therefore electrically connected to one of the load conductors L1, L2 and L3, respectively, when the carrier member 92 is in the position shown in FIGURES 1 and 2 through an electrically conducting path which extends from one of the fuse terminals 75 through one of the movable contact members 56, through one of the stationary contact members 66 and through one of the terminal connectors 68 to one of the load conductors L1 through L3. A movable contact member 64 is also electrically connected to each of the fuse terminals 75 and mounted on the carrier member 92 for rotation therewith to engage the grounding contact member or bar G2 which is disposed inside the housing 10 adjacent to the bottom 25 when the carrier member 92 is rotated to a second operating position as indicated in phantom in FIGURE 2.

In order to actuate or rotate the carrier member 92 and the associated fuse units F1, F2 and F3 from a normal operating position as shown in FIGURES 1 and 2, when the door 20 is closed, to a second predetermined operating position, as shown in phantom in FIGURES 1 and 2, when the door 20 is fully opened, a link member 48 is disposed to operatively connect the door 20 with the carrier member 92. In particular, one end of the link member 48 is pivotally connected to a plate member 36, which, in turn, is mounted on or fixedly secured to the inside of the door 20. The first end 74 of the link member or operating rod 48 which is pivotally connected to the plate member 36 and the door 20 is arranged for rotation in a plane which is substantially horizontal or perpendicular to the plane of the door 20. The other end of the link member 48 is pivotally connected to a pivot means 76 which is disposed on a vertically extending portion 104 of the bracket member 103 and which projects laterally outwardly from the carrier member 92 at one side thereof. When the door 20 is open or closed, the pivot means 76 is arranged for rotation by the link member 48 in a substantially vertical plane which is parallel to the side wall members 21 and 24 of the housing 10.

In the operation of the switchgear structure shown in FIGURES 1 and 2, when the door 20 is in a closed position, the carrier member 92 is disposed in its normal operating position with the plane of the carrier member 92 being disposed at an oblique angle or inclined with respect to a horizontal plane or with respect to the bottom 25 of the housing 10. A closed electrically conducting path is then formed between each of the power conductors P1, P2 and P3 and the associated load conductors L1, L2 and L3 respectively, through one of the fuse units F1, F2 and F3, respectively, and its associated movable and stationary contact members, as previously explained. In other words, considering the switchgear structure shown in FIGURES 1 and 2 as a circuit interrupting or switching means, when the door 20 is in its closed position and the carrier member 92 is in its normal operating position, the movable contact members 52 and 56 associated with each of the fuse units F1, F2 and F3 are in closed circuit or engaged positions with respect to the associated stationary contact members 62 and 66, respectively. It is to be noted that when the door 20 is in its closed position and the carrier member 92 is in its normal operating position as shown in FIGURES 1 and 2, the movable contact members 54 and 64 associated with each of the fuse units F1, F2 and F3 are in open circuit or disengaged positions with respect to the associated grounding contact members G1 and G2, respectively.

In the operation of the switchgear structure shown in FIGURES 1 and 2, when the door 20 is opened for the purpose of inspecting or maintaining the electrical apparatus or devices disposed within the housing 10, the carrier member 92 will start to rotate in a counterclockwise direction, as viewed in FIGURE 2, about a horizontal axis which extends between the pivot means 78, 79 as soon as the door 20 starts to rotate in a counterclockwise direction as is viewed in FIGURE 1 about a vertical axis through the hinge 29. When the carrier member 92 starts to rotate in a counterclockwise direction, the movable contact members 52 and 56 associated with each of the fuse units F1, F2 and F3 will be immediately actuated to an open circuit or disengaged position with respect to the associated stationary contact members 62 and 66, respectively. When the door 20 is rotated to a fully open position, as indicated in phantom in FIGURES 1 and 2, the carrier member 92 will be rotated to a second predetermined operating position, as best indictaed in phantom in FIGURE 2, which is displaced by a rotational angle of between 80 and 90° from the normal operating position of the carrier member 92. When the door 20 is in the fully open position as shown in FIGURE 2, the movable contact members 54 and 64 associated with each of the fuse units F1, F2 and F3 will be actuated to a closed circuit or engaged position with respect to the associated grounding contact members G1 and G2, respectively, so that both ends of each of the fuse units F1, F2 and F3 will be electrically connected to ground potential and any operating personnel inspecting or replacing the now readily accessible fuse units will be fully protected from any accidental contact with high voltage parts. It is to be noted that the link member 48 also functions as a stop member to limit the rotational travel of both the door 20 and the carrier member 92, when the carrier member 92 is actuated to its normal operating position as shown in FIGURE 1 or when said carrier member is rotated to a substantially vertical, second predetermined operating position when the door 20 is fully open. It is to be understood that in a particular application, one or more disconnecting fuse units, such as the fuse units F1 through F3 may be employed as required to protect one or more electric circuits by rearranging the fuse units disposed on the carrier member 92 or by substituting conducting links for one or more of the fuse links providing conducting links between the stationary contact members disposed on the insulators 82.

Figure 4:
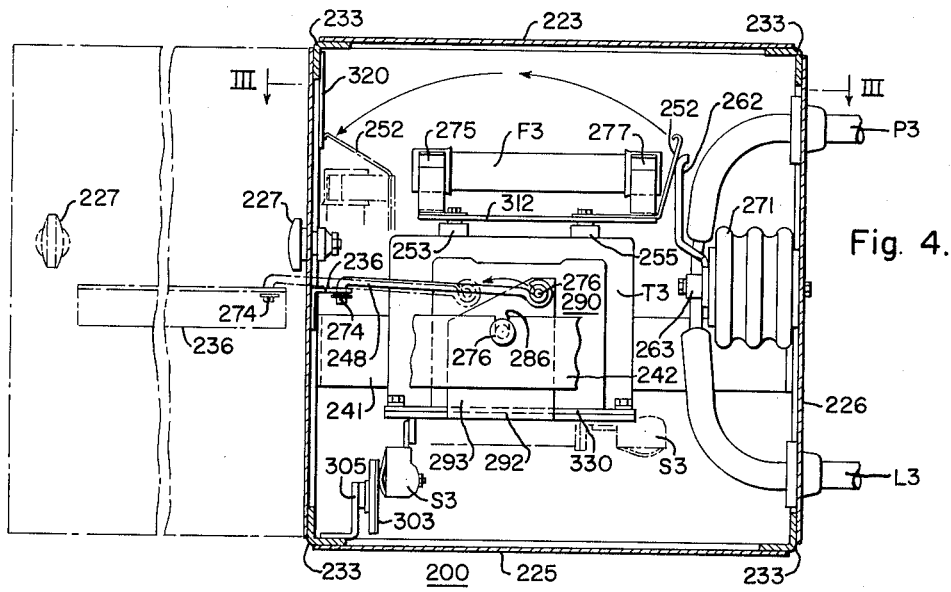
FIGURE 4 is a view, partly in side elevation and partly in section, of the structure shown in FIGURE 3.

Referring now to FIGURES 3 and 4, there is illustrated a second embodiment of the invention in a switchgear structure comprising a housing 200 of the metal-enclosed type which is generally similar to the housing 10 previously described except that the housing 200 is adapted to accommodate one or more transformer units, such as the potential or control power transformers T1, T2 and T3. Similarly to the housing 10, the housing 200 comprises a top 223, a bottom 225, a rear wall member 226, the side wall members 221 and 224 and the angle members 232 and 233. The housing 200 also includes a door 220 which is rotatably supported at one side of the front of the housing 200 by the hinge 229 and may have disposed thereon a handle and latching means 227 which may be of any suitable type.

In order to movably support one or more electrical apparatus units, such as the potential transformers T1, T2 and T3 and their associated disconnecting fuse units F1, F2 and F3, respectively, the carrier or cradle member 290 is disposed within the housing 200. The carrier member 290 which is generally U-shaped in configuration comprises a substantially flat base portion 292 and the side portions 291 and 293 which extend upwardly from the plane of the base portion 292 at the opposite sides thereof. In order to adapt the carrier member 290 for rotation within the housing 200, the pivot means 278 and 279 are mounted on the side portions 291 and 293, respectively, of the carrier member 290 and extend laterally outwardly in opposite directions from the base portion 292 of said carrier member at the sides thereof, as best shown in FIGURE 3.

In order to rotatably support the carrier member 290 within the housing 200, the bracket or rail members 241 and 242 are disposed adjacent to the inner sides of the side wall members 221 and 224 and may be fixedly secured to the adjacent vertical angle members 232 by any suitable means, such as welding or bolts. Each of the rail or bracket members 241 and 242 includes a slot or recess 286 which is adapted to receive and permit rotation of one of the pivot means 278 and 279, respectively, of the carrier member 290 and to releasably support the carrier member 290 which may be lifted out of the slots 286 and slidably removed from the housing 200 by sliding said pivot means along the tops of said rail or bracket members. The carrier member 290 may be formed from a metallic material having sufficient mechanical strength since each of the transformers T1, T2 and T3 includes an electrically insulating body. The carrier member 290 may be electrically grounded in certain applications for safety reasons.

Each of the potential transformers T1, T2 and T3 may be of the type which includes an electrically insulating body and a metallic conducting base plate 330 which may be secured to the carrier member 290 by any suitable means, such as bolts, so that the transformers T1 through T3 are arranged for rotation with the carrier member 290. Each of the transformers T1 through T3 includes a pair of fuse support members 253 and 255 to which are secured the fuse terminals or fuse clips 275 and 277, respectively, which are adapted to receive one of the associated protective fuses F1 through F3, respectively. In order to prevent relative movement of the fuse terminals 275 and 277, a bracing member 312 may be disposed to structurally connect the fuse terminals associated with each of the transformers T1 through T3, said bracing members being preferably formed of electrically insulating material to avoid shunting the associated fuse units F1 through F3. Each of the transformers T1 through T3 includes a movable contact member 252 which is electrically connected to one end of the associated fuse units F1 through F3, respectively, through the fuse terminal 277 and which is disposed to engage a stationary contact member 262 which is disposed on an electrical insulator 271 which, in turn, is supported on or secured to the rear wall member 226 of the housing 200. Each of the stationary contact members 262 is electrically connected to one of the power conductors P1, P2 or P3 through a terminal connector 263, said power conductors being normally connected to a source of high voltage alternating current potential. When the carrier member 290 is in the normal operating position as shown in FIGURES 3 and 4 with the base portion 292 in a substantially horizontal position, the high voltage or primary winding of each of the transformers T1, T2 and T3 is energized through an electrically conductive path which extends from the fuse terminal 275 at one end of one of the associated fuse units F1, F2 and F3, respectively through the respective fuse unit and the fuse terminal 277 to the movable contact member 252, and then through one of the stationary contact members 262 to the terminal connector 263, and finally to one of the power conductors P1, P2 or P3, respectively. Each of the transformers T1, T2 and T3 also includes a plurality of movable secondary contact members, as indicated at S3 for the transformer T3, which are electrically connected to the low voltage or secondary winding of the associated transformer. When the carrier member 290 is in its normal operating position as best shown in FIGURE 4, the secondary contacts S3 of each of the transformers T1 through T3 engage or are in electrically closed circuit relation with associated stationary contact members 303 which are supported from the horizontal angle members 233 adjacent to the bottom 225 of the housing 200 by the bracket members 305.

In order to actuate or rotate the carrier member 290 from its normal operating position, as shown in FIGURES 3 and 4, to a second predetermined operating position, as shown in phantom in FIGURES 3 and 4, whenever the door 220 is open, a link member 248 is provided which operatively connects the door 220 to the carrier member 290. In particular, one end of the link member 248 is pivotally connected to a plate member 236 which, in turn, is fixedly secured to the inner side of the door 220 by any suitable means, such as welding or bolts, while the other end of the link member 248 is pivotally connected to a pivot means 276 which is mounted on the side portion 293 of the carrier member 290 and which extends laterally outwardly from said carrier member. One end of the link member 248 is therefore arranged to rotate with the door 220 in a substantially horizontal plane or in a plane which is substantially perpendicular to the door 220 while the other end of the link member 248 is arranged for rotation in a substantially vertical plane or in a plane which is substantially parallel to the side wall members 221 and 224 of the housing 200. Whenever the door 220 is open or closed, the carrier member 290 is disposed for rotation about an axis which is substantially horizontal and extends between the pivot means 278 and 279 and which is spaced from and parallel to the front plane of the housing 200, as defined by the door 220 when the door 220 is in a closed position.

Similarly to the link 48, the link 248 also functions as a stop member to limit the rotational travel of the door 220 and the carrier member 290 between the predetermined operating positions just described. In order to prevent overtravel of the carrier member 290, the additional stop member 235, shown in FIGURE 3, may be disposed on the side portion 291 of the carrier member 290 to engage the rail member 241 and prevent rotational travel of the carrier member 290 in a clockwise direction as viewed in FIGURE 4 beyond a substantially horizontal position.

In order to permit the transfer of electric power from the power conductors P1, P2 and P3 beyond the transformers T1 through T3 into other compartments or housings, the load conductors L1, L2 and L3 may be electrically connected to the power conductors P1 through P3, respectively at the terminal connectors 263 disposed on the insulators 271.

In general, the operation of the switchgear structure shown in FIGURES 3 and 4 is similar to the operation of the switchgear structure included in the housing 10 previously described. Considering the switchgear structure shown in FIGURES 3 and 4 as a circuit interrupting or switching means, when the carrier member 290 is in its normal operating position as shown in FIGURES 3 and 4, the movable contact members 252 are in closed circuit or engaged positions with respect to the associated stationary contact members 262 and the secondary movable contact members S3 are also in closed circuit or engaged positions with respect to the associated stationary contact members 303. When the door 220 is moved or rotated from a closed position in a counterclockwise direction, as viewed in FIGURE 3, the carrier member 290 moves or rotates in a counterclockwise direction as viewed in FIGURE 5 to disengage each of the movable contact members 252 from the associated stationary contact members 262 so that the transformers T1, T2 and T3 are no longer connected in circuit relation with the power conductors P1, P2 and P3. When the door 220 is rotated or moved to a fully open position, as indicated in phantom in FIGURES 3 and 4, the carrier member 290 is rotated or actuated to a second predetermined operating position which is rotationally displaced from its normal operating position by an angle of approximately 80 to 90° to actuate each of the movable contact members 252 associated with the transformers T1 through T3 to an engaged position with respect to the stationary grounding contact member 320 which is disposed in the path of the movable contact members 252 adjacent to and inside the front of the housing 200 and which is fixedly secured, as illustrated, to the upper-horizontal angle member 233 at the front of the housing 200. The movable secondary contact members associated with each of the transformers T1 through T3 are also rotated in a counterclockwise direction, as viewed in FIGURE 4, to disengaged or open circuit positions with respect to the associated stationary contact members 303. When the door 220 is rotated to a fully open position, the fuse units F1, F2 and F3 as well as the transformers T1, T2 and T3 are accessible for inspection or maintenance by operating personnel with the movable contacts associated with said transformers being completely disengaged and electrically connected to ground potential to fully protect any operating personnel when the door 220 is opened.

It is to be understood that in certain applications, a movable contact member may be disposed on each of the transformers T1, T2 and T3 and electrically connected to the end of the associated fuse members F1, F2 and F3, respectively through one of the fuse terminals 277. The latter additional contact members would be disposed to engage one of the bracket members 305 which would then function as a grounding contact member, to eliminate the need for the separate grounding contact member 320 when the carrier member is rotated to its second predetermined operating position, as previously discussed. In the latter arrangement, the bracket members 305 would be modified to include an upwardly extending portion.

In summary, each of the switchgear structures disclosed automatically performs a plurality of functions whenever the door of a switchgear housing in which one or more electrical apparatus units or devices is disposed is opened. First, the electrical apparatus units are automatically disconnected or disengaged from the associated high voltage circuits to which the units are normally electrically connected. Second, the movable contacts of the electrical apparatus units disposed within the housing are automatically connected to ground potential when the door of the housing is fully opened to completely protect any operating personnel who have occasion to open the door of the housing. Third, the electrical apparatus units rae moved or actuated to a position in which they are readily accessible at the front of the associated housing for inspection or maintenance purposes by operating personnel.

The apparatus embodying the teachings of this invention has several advantages. For example, the switch-gear structures as disclosed are less complicated than switchgear structure which have been employed in the past for similar purposes. In addition, the automatic movement of the electrical apparatus units and the associated carrier is accomplished substantially within the switchgear housing without the necessity for actuating the apparatus units to a position outside the associated housing. Finally, the switchgear structure as disclosed permits the use of a housing door which is disposed on vertical hinges so that the housing may be employed at any height in an overall switchgear housing of the metal-enclosed type.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A switchgear apparatus comprising a housing including an opening therein and vertically and horizontally disposed members, a door hinged on one of said vertically disposed members to normally close the opening in said housing, a base member for supporting an electrical device, said base member being disposed in said housing for rotation about a horizontal axis which is displaced from and substantially parallel to said door when said door is in the closed position, a stationary contact member disposed in said housing, an electrical contact member carried by said base member, and a link connecting said base member to the inner side of said door to rotate said base member between first and second positions when said door is rotated between a closed position and a predetermined open position to cause said electrical contact member to move from an engaged position to a disengaged position with respect to said stationary contact member.

2. A switchgear apparatus comprising a housing including an opening therein and vertically and horizontally disposed members, a door hinged on one of said vertically disposed members and disposed to close the opening in said housing, a base member for supporting an electrical device, said base member being disposed in said housing for rotation about a horizontal axis which is displaced from and substantially parallel to said door when said door is in the closed position, a stationary contact member disposed in said housing, an electrical contact member carried by said base member, a link connecting said base member to the inner side of said door to rotate said base member between first and second positions when said door is rotated between a closed position and a predetermined open position to cause said electrical contact member to move from an engaged position to a disengaged position with respect to said stationary contact member, and a grounding contact member disposed in said housing to be engaged by said movable contact member when said door is rotated to said predetermined open position.

3. A switchgear structure comprising a housing having an opening therein, horizontal rails disposed therein and a door hinged at one substantially vertical side thereof and disposed to close the opening in said housing, a base member for supporting an electrical device disposed within said housing, pivot means disposed at the sides of said base member and spaced from one another along a substantially horizontal axis for rotatably supporting said base member on said rails, a movable contact member arranged to rotate with said base member, a stationary contact member disposed inside said housing to be engaged by said movable contact member in at least one position of said base member and a link pivotally connecting said door and said base member to rotate said base member and actuate said movable contact member from an engaged position with respect to said contact member to a disengaged position when said door is moved from a closed position with respect to said housing to a predetermined open position.

4. A switchgear structure comprising a housing having an opening therein, horizontal rails disposed therein and a door hinged at one substantially vertical side thereof to normally close the opening in said housing, a base member for supporting an electrical device disposed within said housing, pivot means disposed at the sides of said base member and spaced from one another along a substantially horizontal axis for rotatably supporting said base member on said rails, a movable contact member arranged to rotate with said base member, a stationary contact member disposed inside said housing to be engaged by said movable contact member in at least one position of said base member, a link pivotally connecting said door and said base member to rotate said base member and actuate said movable contact member from an engaged position with respect to said contact member to a disengaged position when said door is moved from a closed position with respect to said housing to a predetermined open position, and a grounding contact member disposed in the line of movement of said movable contact member.

5. A switchgear structure comprising a housing having an opening therein, spaced horizontal rails disposed therein and a door hinged at one substantially vertical side thereof and disposed to close the opening in said housing, a base member for supporting an electrical device disposed within said housing, pivot means disposed at the sides of said base member and spaced from one another along a substantially horizontal axis for rotatably supporting said base member on said rails, said rails each having a recess to receive said pivot means of said base member, a movable contact member arranged to rotate with said base member, a stationary contact member disposed inside said housing to be engaged by said movable contact member in at least one position of said base member and a link pivotally connecting said door and said base member to rotate said base member and actuate said movable contact from an engaged position with respect to said contact member to a disengaged position when said door is moved from a closed position with respect to said housing to a predetermined open position.

6. A switchgear structure comprising a substantially rectangular housing including an opening therein and vertical and horizontal members, a door member hinged on one of said vertical members to normally close the opening in said housing, a carrier for supporting an electrical device disposed within said housing, supporting means horizontally disposed on the inner sides of said housing for rotatably supporting said carrier, said carrier being disposed to rotate about a substantially horizontal axis which is substantially parallel to and displaced from said door member when said door member is in a closed position with respect to said housing, a stationary contact disposed within said housing, a movable contact arranged to rotate with said carrier, and a link member pivotally connecting said door member and said carrier to rotate said carrier between a first position when said door is closed to a second position when said door is opened, said movable contact being disposed to engage said stationary contact in the first position of said carrier and to be disengaged from said stationary contact in the second position of said carrier.

7. A switchgear structure comprising a substantially rectangular housing including an opening therein and vertical and horizontal members, a door member hinged on one of said vertical members to normally close the opening in said housing, a carrier for supporting an electrical device disposed within said housing, supporting means horizontally disposed on the inner sides of said housing for rotatably supporting said carrier, said carrier being disposed to rotate about a substantially horizontal axis which is substantially parallel to and displaced from said door member when said door member is in the closed position with respect to said housing, a stationary contact disposed within said housing, a movable contact arranged to rotate with said carrier, and a link member pivotally connecting said door member and said carrier to rotate said carrier between a first position when said door is closed to a second position when said door is opened, said movable contact being disposed to engage said stationary contact in the first position of said carrier and to be disengaged from said stationary contact in the second position of said carrier, said supporting means being arranged to release said carrier when said link member is disconnected to permit sliding movement of said carrier on said supporting means into and out of said housing.

8. A switchgear structure comprising a substantially rectangular housing including an opening therein and vertical and horizontal members, a door member hinged on one of said vertical members to normally close the opening in said housing, a carrier for supporting an electrical device disposed within said housing, supporting means horizontally disposed on the inner sides of said housing for rotatably supporting said carrier, said carrier being disposed to rotate about a substantially horizontal axis which is substantially parallel to and displaced from said door member when said door member is in the closed position with respect to said housing, a stationary contact disposed within said housing, a movable contact arranged to rotate with said carrier, and a link member pivotally connecting said door member and said carrier to rotate said carrier between a first position when said door is closed to a second position when said door is opened, said movable contact being disposed to engage said stationary contact in the first position of said carrier and to be disengaged from said stationary contact in the second position of said carrier, a grounding contact member disposed in said housing in the line of movement of said movable contact.

References Cited by the Examiner

UNITED STATES PATENTS

| | | | |
|---|---|---|---|
| 2,504,876 | 4/50 | Pringle | 200—50 |
| 2,594,075 | 4/52 | Rugg | 317—99 |
| 2,669,624 | 2/54 | Ferguson | 200–50 X |
| 2,689,293 | 9/54 | Claybourn et al. | 200—168 |
| 3,052,820 | 9/62 | Kreekon et al. | 317—99 |

BERNARD A. GILHEANY, *Primary Examiner.*